United States Patent Office 3,651,045
Patented Mar. 21, 1972

3,651,045
9-(β-D-ARABINOFURANOSYL)ADENINE ESTERS AND METHODS FOR THEIR PRODUCTION
Theodore H. Haskell, Ann Arbor, Mich., and Stephen Hanessian, Beaconsfield, Quebec, Canada, assignors to Parke, Davis & Company, Detroit, Mich.
No Drawing. Filed Oct. 21, 1968, Ser. No. 769,423
Int. Cl. C07d 51/54
U.S. Cl. 260—211.5 R       5 Claims

ABSTRACT OF THE DISCLOSURE 9-(β-D-arabinofuranosyl)adenine esters, such as 9-(β-D-arabinofuranosyl)adenine, triacetate ester and N'-(9-β-D-arabinofuranosyl - 9H-purin-6-yl) - N,N-dimethylformamidine, triformate ester, and their production by reacting 9-(β-D-arabinofuranosyl)adenine with a reactive derivative of an alkanoic acid or with (chloromethylene)dimethylammonium chloride. The ester compounds are useful as antiviral agents that are more efficiently absorbed upon oral administration to standard experimental animals than is 9-(β-D-arabinofuranosyl)adenine.

---

The present invention relates to new organic ester compounds that are useful as pharmacological agents and to methods for their production. More particularly, the invention relates to new 9-(β-D-arabinofuranosyl)adenine ester compounds that are represented by the formula

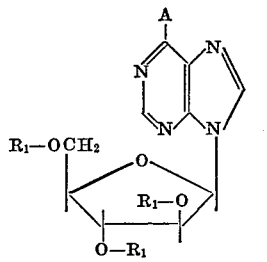

where $R_1$ is a lower alkanoyl group having not more than 4 carbon atoms, and A is amino (—$NH_2$) or N,N-dimethylformamidino[—N=CH—N($CH_3$)$_2$], with the further proviso that $R_1$ is formyl when A is N,N-dimethylformamidino. Examples of lower alkanoyl groups represented by $R_1$ are formyl, acetyl, propionyl, and isobutyryl.

In accordance with the invention, 9-(β-D-arabinofuranosyl)adenine ester compounds having the formula

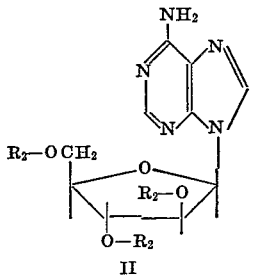

are produced by reacting 9-(β-D-arabinofuranosyl)adenine with a reactive derivative of an alkanoic acid that can be represented by the formula $R_2$—OH

III where $R_2$ is a lower alkanoyl group having from 2 to 4 carbon atoms. Suitable reactive derivatives of the acid of Formula III that may be used for this purpose are the acid anhydride and an acid halide. When an acid halide, preferably an acid chloride, is used, a tertiary amine catalyst, such as triethylamine, N,N-dimethylaniline, or pyridine, is added to the reaction mixture in an amount sufficient to bind the hydrohalic acid liberated. When the acid anhydride is employed, it is preferable to add to the reaction mixture either a basic catalyst, such as one of those named above, or an acidic catalyst, such as sulfuric acid, perchloric acid, or p-toluenesulfonic acid. The reaction is advantageously carried out in an unreactive solvent medium. Suitable solvents for this purpose include ethers, such as 1,2-dimethoxyethane, dioxane, and tetrahydrofuran; chlorinated hydrocarbons, such as chloroform and methylene chloride; and tertiary amides, such as N,N-dimethylformamide, N,N-dimethylacetamide, and N-methyl-2-pyrrolidinone; as well as mixtures of these. If desired, any of the tertiary amine catalysts named above may be be used as solvent, if an excess is added. The precise temperature and duration of the reaction are not critical and may be varied widely depending upon the reactants and solvent employed. When either an acid halide or the acid anhydride is used in the presence of a tertiary amine catalyst, the reaction temperature can be varied between about 0° and about 40° C., preferably between 5° and 25° C., and at such a temperature, the reaction is essentially complete after a period of about 12 to about 24 hours, although longer periods, up to 48 hours, may also be used. Equivalent amounts of reactants, that is, 3 moles of the reactive alkanoic acid derivative for each mole of 9-(β-D-arabinofuranosyl)adenine, may be used. To insure complete reaction, however, it is preferable to employ a moderate to large excess of the alkanoic acid derivative. When an excess of this derivative is used, the excess is decomposed at the conclusion of the reaction, by the addition of a lower alkanol or water, prior to isolation of the product.

Also in accordance with the invention, N'-(9-β-D-arabinofuranosyl-9H - purin-6-yl)-N,N - dimethylformamidine, triformate ester, which is represented by the formula

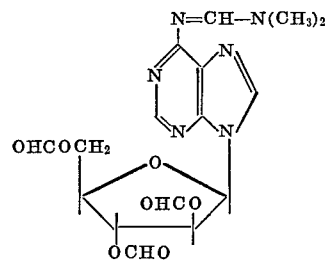

is produced by reacting 9-(β-D-arabinofuranosyl)adenine with (chloromethylene)dimethylammonium chloride. The reaction is best carried out in a nonreactive solvent medium. Suitable solvents include ethers, such as dioxane, tetrahydrofuran, and 1,2-dimethoxyethane; chlorinated hydrocarbons, such as methylene chloride and chloroform; and N,N-dimethylformamide. A preferred solvent is N,N-dimethylformamide. The temperature of the reaction is not especially critical and may be varied over a wide range, from 0° to 50° C. It is convenient to carry out the reaction at room temperature. The duration of the reaction is likewise not critical and may be varied from several hours to several days. At room temperature, it is essentially complete after a period of from 12 to 24 hours. While equivalent amounts of reactants may be employed, that is, 4 moles of (chloromethylene)dimethylammonium chloride per mole of 9-(β-D-arabinofuranosyl)adenine, it is preferable to use a slight to moderate excess of the (chloromethylene)dimethylammonium chloride to insure complete reaction.

The 9-(β-D-arabinofuranosyl)adenine ester compounds are new chemical compounds that are useful as pharmacological agents, especially as antiviral agents. As such, they have been found to be active against both herpes and vaccinia viruses.

Their activity as antiviral agents can be quantitatively measured in an in vitro test by utilizing the plaque reduction technique first developed by Dulbecco [Proc. Natl. Acad. Sci., vol. 38, pages 747–752 (1952)] and modified by Hsiung and Melnick [Virology, vol. 1, pages 533–535 (1955)]. In this test, a complete cell monolayer is first grown on a glass test unit. The growth medium is then removed, and the virus is adsorbed on the cell monolayer for a measured time period. In the absence of an antiviral agent, the virus will destroy well-defined areas of cells, called plaques, that can be seen macroscopically when the vital stain, neutral red, is added to the system. To test the inhibiting effect of a given compound, the test compound in solution is added to the virus-cell system, and the whole is covered with a nutrient agar overlay containing neutral red. After incubation, the plaques are counted, and the number of plaques produced in the system containing the test compound is compared with the number produced in the control systems, from which only the test compound is omitted. The inhibitory activity of a test compound is reported as the percentage reduction of the plaque count on the test units compared with that on the controls.

When tested by this plaque reduction technique, with 4 oz. glass bottles serving as the test units and H. Ep. No. 2 cells making up the cell monolayer, the preferred compound of the invention, 9-(β-D-arabinofuranosyl)adenine, triacetate ester, at a concentration of 100 micrograms/ml. in Hanks' Balanced Salt Solution (pH 7–8), was found to give a 100% plaque reduction against both herpes simplex and vaccinia viruses.

As can be seen from Formula I, the ester compounds of the invention are derived from and hence are structurally related to 9-(β-D-arabinofuranosyl)adenine, which is known to be an antiviral agent that is active primarily against herpes and vaccinia viruses. While structurally related, the ester compounds of the present invention offer an advantage in use over 9-(β-D-arabinofuranosyl)adenine, since it has been found that these ester compounds are more efficiently absorbed upon oral administration to standard experimental animals than is 9-(β-D-arabinofuranosyl)adenine with the result that significantly higher blood levels of the active agent over a longer period of time following administration are achieved with the ester compounds.

The invention is illustrated by the following examples.

EXAMPLE 1

To a suspension of 42 g. of 9-(β-D-arabinofuranosyl) adenine in 500 ml. of dry pyridine, cooled to 5–10° C., is added with stirring 60 ml. of acetic anhydride, and the resulting mixture is stirred at room temperature for 6 hours and at 5° C. for 16 hours. The resulting solution is then treated with 50 ml. of methanol, and the mixture is concentrated under reduced pressure. The treatment with methanol and concentration are repeated 3 times, after which the syrupy residue finally obtained is treated with 70 ml. of toluene. The toluene mixture is then evaporated to dryness, and the syrup again obtained is dissolved in a small amount of warm ethanol. The ethanolic solution is then kept at room temperature until crystallization of the solid 9-(β-D-arabinofuranosyl)adenine, triacetate ester, product is complete. The solid product is then isolated, washed with cold ethanol, and recrystallized from ethanol; M.P. 140–141° C., $[\alpha]_D$ —13.4° (0.764% in chloroform).

EXAMPLE 2

To a suspension of 5.0 g. of 9-(β-D-arabinofuranosyl) adenine in 100 ml. of dry pyridine is added with stirring 12 ml. of propionic anhydride, the mixture is stirred for 6 hours at room temperature, and the resulting solution is then kept at 5° C. for 16 hours. Methanol (20 ml.) is added, and the methanolic solution is kept for one hour at room temperature and then evaporated under reduced pressure. The treatment with methanol and evaporation are repeated, following which the syrupy product mixture is treated similarly twice more with water. The final syrup obtained is then mixed with water, and the aqueous mixture is extracted twice with chloroform. The combined chloroform extracts are washed successively with 2 N hydrochloric acid, with water, with saturated aqueous sodium bicarbonate, and with water again, then dried and evaporated under reduced pressure. The syrupy residue obtained is dissolved in warm ether, and the ether solution is cooled to give crystalline 9-(β-D-arabinofuranosyl)adenine, tripropionate ester, which is isolated, washed with diethyl ether-petroleum ether, and dried; M.P. 111–113° C.

Utilizing the foregoing procedure with the substitution of 16 ml. of isobutyric anhydride for the propionic anhydride, there is obtained 9-(β-D-arabinofuranosyl)adenine, triisobutyrate ester, as a gummy solid.

EXAMPLE 3

To a stirred suspension of 5.1 g. of 9-(β-D-arabinofuranosyl)adenine in 100 ml. of dry N,N-dimethylformamide is added 23 g. of (chloromethylene)dimethylammonium chloride, the resulting mixture is stirred at room temperature for 20 hours, and the solution obtained is poured into saturated aqueous sodium bicarbonate. The aqueous mixture is then extracted with two 200 ml. portions of chloroform, and the combined chloroform extracts are washed with water, dried, and concentrated to a volume of about 200 ml. The chloroform solution is then diluted with an equal volume of ether, and the mixture is cooled to give crystalline N'-(9-β-D-arabinofuranosyl-9H-purin-6-yl)-N,N - dimethylformamidine, triformate ester. Excess ether is then added to the mixture to insure complete precipitation, and the entire solid product is isolated, washed with ether, and dried; M.P. 161–165° C.

We claim:

1. A 9-(β-D-arabinofuranosyl)adenine ester compound having the formula

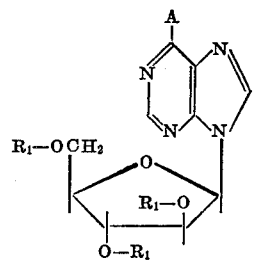

where $R_1$ is lower alkanoyl having not more than 4 carbon atoms, and A is a member of the class consisting of amino(—$NH_2$) and N,N-dimethylformamidino
[—N=CH—N($CH_3$)$_2$]
with the further proviso that $R_1$ is formyl when A is N,N-dimethylformamidino.

2. 9-(β-D-arabinofuranosyl)adenine, triacetate ester.

3. 9 - (β - D - arabinofuranosyl)adenine, tripropionate ester.

4. N'-(9-β-D-arabinofuranosyl - 9H - purin-6-yl)-N, N-dimethyformamidine, triformate ester.

5. Process for the production of N'-(9-β-D-arabinofuranosyl-9H-purin-6-yl)-N,N-dimethylformamidine, triformate ester which comprises reacting 9-(β-D-arabinofuranosyl)adenine with (chloromethylene)dimethylammonium chloride.

References Cited
UNITED STATES PATENTS

| | | | |
|---|---|---|---|
| 3,472,838 | 10/1969 | Hanessian | 260—211.5 |
| 2,993,039 | 7/1961 | Schroeder | 260—211.5 |
| 3,014,900 | 12/1961 | Schroeder | 260—211.5 |

OTHER REFERENCES

Lee et al., "Chem. Abstr.," vol. 54, 1960, p. 18532 ©.

Reist et al., "Chem. and Industry," September 1965, No. 36, pp. 1561 and 1562.

LEWIS GOTTS, Primary Examiner

J. R. BROWN, Assistant Examiner

U.S. Cl. X.R.

424—180